United States Patent Office
3,640,944
Patented Feb. 8, 1972

3,640,944
MODIFIED POLYESTER FILM FOR PUNCHED TAPES

Harold J. Seppala, Woodbury Township, Washington County, and Gerhard Benz, Cottage Grove Township, Washington County, Minn., assignors to Minnesota Mining and Manufacturing Company, St. Paul, Minn.
No Drawing. Filed Jan. 31, 1969, Ser. No. 795,741
Int. Cl. C08g *51/04*
U.S. Cl. 260—40 11 Claims

ABSTRACT OF THE DISCLOSURE

A durable, relatively non-abrasive film having utility as a program tape is prepared by physically blending major amounts of polyethylene terephthalate with minor effective amounts of high melting polymers such as polysulfone or poly (4-methyl, 1-pentene) and a light absorbing material, extruding the blend as a film and thereafter biaxially orienting it. The film allows as little as 1% light transmission and has a surface which can be written on with pencil or pen.

BACKGROUND OF THE INVENTION

The invention relates to punched program tapes which are strong, highly durable and relatively non-abrasive.

In modern society, much information is recorded on and transmitted by tapes in which holes are punched in some coded pattern. A punched tape is fed to a receiver which employs either a photoelectric device or a series of mechanical probes to sense the encoded information and use it to operate a metal working machine, type out the message, etc. Since photoelectric sensing methods are common, it is important for the tape to be opaque. It has been found that no more than 10% light transmission is acceptable, else inaccurate translation may result, perhaps with disastrous results.

Tapes in a wide range of durability and cost are commercially available, for single use office communications to multiple use in machine shop environments. Generally, the tape should be one which is strong and durable so that it will hold up during repeated use on a punching and reading machine. It should be non-abrasive to the machine punches to prevent wear and replacement thereof, which saves time and reduces the cost of production. It is also desirable that the tape can be written on, thereby allowing notations and corrections to be put on the tape. Finally, the tape should be as opaque as possible, thus reducing light transmission therethrough and allowing a more accurate reading when a photoelectric reading device is used.

An example of a commercial program tape used at present is a paper tape which is low in cost, opaque, and capable of taking writing, but is not very durable and generally loses its utility after a short period of time. It is also abrasive to the punch and causes wear. Laminating a layer of paper to each side of a polyester film upgrades the strength of the paper but increases the rate of punch wear, necessitating replacement of the punch at relatively short intervals. Furthermore, if oil gets on this tape or the straight paper tape, possibly from the machine shop environment, the tape may become translucent and the opacity which is required of a punched program tape, if read photoelectrically, is lost.

The most popular high durability tapes which are employed for multiple uses where much value is represented in the programmed tape utilize an aluminum foil having a layer of polyester film on each side, thereby forming a laminate. Alternatively, one film may be aluminum vapor-coated, the coated face then being laminated to a second film, the film fixed by adhesive. These tapes are strong and the aluminum foil or vapor coat provides the necessary opacity. However, these tapes tend to produce excessive punch wear and gumming of the punch mechanism on continuous use, are difficult to surface mark or identify, and are relatively difficult and expensive to make.

Loading a polyester film with about 3 to 5% by weight of a pigment or dye material imparts opacity but does not result in a good program tape. Being relatively insoluble and not readily dispersable in the polyester, these light absorbing materials are preferably premixed with a carrier which will allow dispersion of the dye or pigment throughout the film. As a result, the combined quantity of dye and carrier reaches 5–10% of the total film, thereby impairing the required physical properties of the film, such as tensile strength. Moreover, a large percent of a dye in the film will result in a very dark tape which will not contrast well with pen or pencil marks thereon.

In short, none of the program tapes used at the present time have all the desired properties of a good program tape. The strong and durable tapes are abrasive, may delaminate and lack a write-on capability. Tapes lower in abrasive properties and having a write-on capability, lack strength and durability.

SUMMARY

The present invention provides a program tape which is strong and durable. The tape is formed from a single sheet, thereby minimizing cost and obviating the possibility of delamination at high operating speeds and the resulting temperature buildup. Due to the matte surface of the film, it can be written on with pencil, pen, crayon, etc. Another important feature is the high opacity of the tape allowing less than 5% light transmission therethrough. Because of the properties of the components in this tape, and due to the fact that it is not a laminate, there is reduced abrasion and no adhesive gumming to the machine which perforates the tape.

As a result, the tape of this invention has all the strength, durability and opacity properties of the best prior art tapes and, additionally, is less abrasive and has the capacity to take pen and pencil marks.

In accordance with the present invention, minor amounts of a thermoplastic high temperature polymer, melting or softening above the glass transition temperature of polyethylene terephthalate (typically 67° C.), and a light-absorbing material, are added to a major amount of the polyethylene terephthalate polymer in an extruder. The additive polymers have been found to be effective for many applications when about 1 to 30% by weight is used. Although about 0.2 to 0.4% of the light-absorbing material is preferred, satisfactory results have been obtained when up to 3% has been used.

The blending can be effected either by introducing the additive polymer and light absorbing material into the reaction kettle in which the polyethylene terephthalate has been polymerized, or by introducing the polyester, the light-absorbing material and the additive polymer into the extruder alone or together. In the extruder the polymeric materials melt but are incompatible with each other. That is, they mix physically but not chemically.

The mixture from the extruder is cast as a film and thereafter biaxially oriented. When examined under the electron microscope, films formed in accordance with the invention are seen to contain various shaped inclusions of additive polymer and dye particles interspersed throughout the film.

During the biaxial orientation, the polyester polyethylene terephthalate softens and the dimensions of the film are changed while the additive polymer, which does not melt, stays approximately the same size and remains in the form of discrete microscopic particles. When the polyester is stretched over the additive, voids are formed near the additive. Although applicants do not wish to be bound by any specific theory, it is believed that the voiding results from the rupturing of any bond initially formed between the additive material and the wall portions of the polyester cells accommodating said material, the pulling away of the cell wall portions from the individual particle accommodated therein and enlargement of the cell to include an opacifying void space. Light transmission is substantially reduced to about 30–50%, because of diffusion of light due to the difference in the refractive indices of the two polymers and the voids.

The amount of light transmission is measured by a procedure described by the U.S.A. Standards Institute in Proposed U.S.A. Standard Specification for Properties of Unpunched Paper Perforator Tape, X 3.2/6 01/Sept. 21, 1967, (revision X 3.2/561/July 14, 1967). A high intensity light source is positioned 5 inches from the tape material. Immediately on the other side of the tape is a light reader consisting of an aperture of 0.074 inch in diameter and a photocell forming the back wall of the aperture. The light from the light source passes through the tape, into the aperture and strikes the photocell at the back of the aperture which is connected to a galvanometer. A 0% reading indicates no light is being transmitted through the tape, while a 100% reading indicates full transmission. Intermediate values are read on a linear scale between 0 and 100%.

An unmodified oriented polyethylene terephthalate film having the same thickness, allows about 90 to 94% light transmission therethrough, but upon voiding this value is decreased to about 30 to 50% light transmission through the film.

For program tape purposes, however, 30 to 50% light transmission is too great to allow accurate photoelectric reading of the holes in the tape. Reliable results may be obtained when the tape exhibits less than 10% light transmission therethrough but to assure the best results possible it is preferred that the tape exhibit less than 3% light transmission.

Surprisingly, when both dye and additive polymer are included in the polyester film, reduction of light transmission results. It has been determined that a 3 mil polyester film containing, e.g., 0.3 to 0.5% by weight dye without any additive polymer has 10 to 15% light transmission. As previously noted, the inclusion of only the high temperature additive polymer in the polyester film allows from 30 to 50% light transmission. One might expect light transmission of a polyester film having both would fall below 10%; surprisingly, however, the light transmission of such films is reduced to below 2%. Because of the increased opacity and very low light transmission, very accurate readings may be had from the punched tape of this invention.

Stretching a polyethylene terephthalate film ordinarily increases its density. In stretching a film containing the high temperature polymer inclusions the density increases in the expected manner until the bond between the particles and the matrix polymer begins to rupture and form the opacifying voids. At this point, due to the formation of the voids and the increase in the size thereof in accordance with the amount of further stretching, the density of the body begins to decrease, and such decrease continues with further stretching.

It has been found that the density of the final product is lower than the density of either the polyester resin or the organic inclusion resin alone. For example, the density of polyethylene terephthalate is about 1.40 gms./cc. when biaxially oriented while the density of polysulfone is 1.24 gms./cc. The density of the biaxially oriented blended film product is 1.18 to 1.25 gms./cc. A low density tape has some unique advantages. Because of its 5–25% weight reduction compared to existing tapes, tape rolls will exhibit less momentum when undergoing rapid acceleration and deceleration during handling. This results in reduced wear on the tape and the equipment. Additionally, the lower density allows easier penetration of the punch with less wear thereof.

Another advantage of the program tape of this invention is its receptivity to pen, pencil, ballpoint, and crayon marks. As the inclusion particles are not chemically united with the polyester, but are physically held by it, the particles on the surface of the film protrude somewhat and provide a visibly matte surface which is receptive to marking.

Abrasiveness of the tape can be determined by noting the punch and die wear and consequent incomplete punching during the perforating operation. It has been found that an alternative means of determining the tendency of a given tape to abrade and/or wear a punch can be made by slitting 1200 feet of the tape with a new razor blade at a 60° angle to the film, and at a speed of 150 feet per minute. Photomicrographs (80× magnification) are taken of the blade cutting edge before and after slitting. The relative abrasion is determined by a visual estimation of the edge removed or displaced.

DESCRIPTION OF PRESENTLY PREFERRED EMBODIMENTS

The invention will be further understood by reference to the following illustrative, but non-limiting examples, in which all parts are by weight unless otherwise noted.

Example 1

In a stainless steel reactor equipped with a distillation column and an agitator, 62 parts of dimethyl terephthalate was transesterified with 44 parts of ethylene glycol, in the presence of 0.04% calcium acetate, 0.053% antimony trioxide, and 0.053% of manganese acetate. After removing the methanol which was evolved in the reaction, the reaction mixture was raised to 250° C. for 32 minutes, at the end of which time 95% of the theoretical excess of ethylene glycol had been distilled and collected. A vacuum was slowly applied while the prepolymer was rapidly stirred and gradually heated to 280° C. Heating and stirring were continued for one hour after a pressure of 0.5 gm. Hg was obtained. The polyethylene terephthalate obtained which has a glass transition temperature of 67° C., was cooled, crushed, and dry blended with 8% polysulfone, available commercially from Union Carbide under the tradename "Bakelite Polysulfone Resin P–3500," having a melting point of 232° C., and 0.3% of "Solvent Black 7," commercially available from General Aniline and Film Corp. under the trade name "Nigrosine Base NB," the balance of the blend comprising the polyester, and charged to an extruder. The blend was then extruded as a 30-mil sheet, and biaxially oriented to a thickness of about 3 mils; e.g., three times the original dimensions in each direction. The film was then slit into desired roll widths and subjected to a series of physical tests.

The tape of this example was tested for light transmission according to the test heretofore described. Light transmission was found to be as low as 1% in almost all cases, never exceeding 5%.

The tape was also tested for its abrasion properties according to the razor blade abrasion test heretofore described. The amount of abrasion, since determined by visual observation, was arbitrarily assigned values from 0 to 10, the following table showing the results:

| Tape | Ranking | Degree of abrasion |
|---|---|---|
| | 0 | No abrasion—unused blade. |
| | 1 | |
| Tape of Example 1 | 2 | |
| 3.0 mil polyester film | 3 | |
| Polyester/alum. vapor coat/ polyester laminate | 4 | |
| | 5 | |
| Polyester/aluminum foil/ polyester laminate | 6 | |
| | 7 | |
| Paper/polyester/paper laminate | 8 | |
| Paper tape (oiled) | 9 | |
| | 10 | High degree of abrasion—deep notch. |

Punching trials on tape of this example were made with a Tally Model 420 Perforater with no punching problems indicated. Photomicrographs of code and machine sprocket holes revealed clean outlines with no distortion. The breaking tensile strength was from 60 to 75 pounds per inch of width. Density was found to be 1.18 to 1.25 gm./cc.

The resulting tape exhibited strength, durability, and light transmission properties similar to the polyester-aluminum foil-polyester laminate, polyester-aluminum vapor coat-polyester laminate and paper program tapes, but displayed less abrasiveness and lower density than the above tapes, and, additionally, a write-on capacity. In the case of paper tapes, the novel program tape of this invention exhibited greater strength and durability. As a single layer tape, there was no delamination or gumming of the punch mechanism due to laminate adhesive during continuous use at relatively high punching temperatures. The tape displayed good workability on the machine, and little abrasion to the punch. The punched tape displayed accurate readings on mechanical and photoelectric reading and receiving devices.

The tape was a gray color and exhibited a visually observable coarse or matte surface. The additive particles were of various shapes and microscopically observable as a component of the film surface. Pen, pencil, and crayon marks were made on the tape and were readily held thereby and easily observable.

Example 2

The same formulation and procedure as employed in Example 1 was used with the exception that the "Solvent Black 7" was premixed into a liquid carrier available from Rohm and Haas Corp. under the trade name "Paraplex G–30," and alkyd polymeric plasticizer used as a low volatile liquid flexabilizing agent. The dye and carrier were premixed in a stirred tank and charged to a sand mill until the dispersion was complete and no settling of the dye particles occurred. Any high shear solid-liquid dispersing equipment may be used. This mixture was then metered into the barrel of the extruder to be blended with the polyethylene terephthalate and polysulfone melts.

The blend was extruded into a 30-mil sheet, biaxially oriented to a thickness of about 3 mils, and subjected to a series of physical tests. The results obtained were similar to those in Example 1.

Example 3

The same procedure and formulations as recited in Example 2 were used. However, the polyethylene terephthalate was charged to the extruder alone, while the dye in a liquid carrier and polysulfone were metered separately by "tapping" the barrel and feeding into the extruder where all were blended.

Upon testing, the results obtained were similar to those obtained in Example 1.

Example 4

The formulations and procedures as recited in Example 3 were used. Poly(4-methyl, 1-pentene), commercially available from Imperial Chemicals Industries, Ltd., under the trade name "TPX," was used in place of polysulfone. The film displayed physical properties similar to those of Example 1.

Example 5

The formulations and procedures as recited in Example 3 were used. However, a green dye is used, commercially available from Hilton Davis Chemicals Company under the trade name "Synthetic Green 1915." The film exhibits properties similar to those in Example 1 but is a dark green color rather than gray.

Although outstanding results have been obtained for present purposes by using polysulfone as the additive polymer in the invention, other high temperature, thermoplastic, fusible and non-reactive polymers may be used. High temperature polymers are considered to be those processed and used at temperatures above 250° F., where other polymers degrade. It is believed that high temperature polymers are not flowing at the orientation temperature of the polyester. Examples of such polymers are polyphenyleneoxide and poly(4-methyl, 1-pentene). However, polyphenyleneoxide results in a fairly dark tape which is not as conducive to show writing on the film. Although about 1–30% by weight of the organic inclusion compound may be used, tapes exhibiting the best properties were obtained when about 8% is used. Different amounts may be used to vary the properties of the final product. For example, where a green or blue dye is used rather than a black one, there is normally more light transmission, as black absorbs more light than green or blue when in comparative amounts. Thus, more additive might be used to decrease light transmission while preparing tapes of various colors.

Various light-absorbing dye and pigment materials may be used, the main requirement being light absorbency. This property is necessary so that the dye may act in combination with the voiding to reduce light transmission. Very satisfactory results have been obtained using organic dyes, which are also less abrasive to the punch than pigments. As black is the most light-absorbing color, a black dye is preferred, especially those of the nigrosine family. However, other dark colored dyes may be used so that different colored tapes may be prepared. The dye may be mixed with a plasticizer and homogeneously dispersed throughout the film, both in the organic inclusion particle and the polyester, but may alternatively be dispersed in a dry blend. The plasticizer is used as a carrier for the dye, which is relatively insoluble. A plasticizer is used as a carrier rather than a solvent because it is less volatile and does not tend to evaporate. Moreover, the plasticizers compatability with and mobility of the plasticizer through the matrix polymer allows good dispersion of the dye therethrough. However, a plasticizer tends to diminish the tensile strength of the film; thus, as little dye as possible is used to lessen the amount of plasticizer required.

What is claimed is:

1. A biaxially oriented, highly durable program tape characterized by having very low light transmission and minimum abrasion to a punching mechanism, said tape formed of a visually uniform blend of a major portion of polyethylene terephthalate polymer, from about 1 to 30% by weight of a thermoplastic, high temperature, opacifying, additive polymer having a melting point higher than the glass transition temperature of said polyethylene terephthalate polymer and capable of reducing light transmission through said polyethylene terephthalate polymer to 30% to 50%, and an effective minor amount of a light absorbing material, in the range of from about 0.2 to 3%, when said tape has a thickness of about 3 mils, said additive polymer being distributed throughout said tape in the form of discrete microscopic particles.

2. A biaxially oriented essentially non-abrasive highly durable program tape as recited in claim 1 wherein an additive polymer is selected from the class consisting of polysulfone and poly(4-methyl, 1-pentene).

3. A biaxially oriented essentially non-abrasive highly durable tape as recited in claim 1 wherein said light-absorbing material is an organic dye.

4. A tape as recited in claim 2 wherein the additive polymer is polysulfone.

5. A tape as recited in claim 4 wherein the polysulfone is present as 8% by weight of the tape.

6. A tape as recited in claim 2 wherein the additive is poly(4-methyl, 1-pentene).

7. A tape as recited in claim 3 wherein the light-absorbing organic dye is a nigrosine dye.

8. A tape as recited in claim 7 wherein the nigrosine dye is present in a 0.25% concentration.

9. A biaxially oriented essentially non-abrasive highly durable program tape characterized by having less than 5% light transmission, and minimum abrasion to a punching mechanism, said tape being formed from a visually uniform blend of about 91% by weight of polyethylene terephthalate, about 8% by weight of polysulfone and about 1% by weight of a nigrosine dye and a carrier, said polysulfone being distributed throughout said tape in the form of discrete microscopic particles, said tape having a gray color upon which markings are observable when said tape is written on.

10. A method of preparing a biaxially oriented essentially non-abrasive, highly durable program tape providing light transmission of about 1%, comprising the steps of intimately blending a minor amount of a solid, fusible, heat-stable polymer selected from the class consisting of polysulfone and poly(4-methyl, 1-pentene) and an effective amount of a light-absorbing organic dye into a major amount of polyethylene terephthalate, forming a film from the blend, and biaxially orienting the film, whereby voids are formed thereon and said fusible polymer assumes various shapes as small particles which are distributed throughout said film.

11. The method as recited in claim 10 wherein said solid, fusible, heat-stable polymer is polysulfone and said light-absorbing organic dye is a nigrosine dye.

References Cited

UNITED STATES PATENTS

| | | | |
|---|---|---|---|
| 3,088,173 | 5/1963 | Jones | 264—Stretch Digest |
| 3,154,461 | 10/1964 | Johnson | 260—40 UX |
| 3,345,434 | 10/1967 | Griffith | 260—873 X |

FOREIGN PATENTS

| | | | |
|---|---|---|---|
| 887,346 | 1/1962 | Great Britain | 264—Stretch Digest |

MORRIS LIEBMAN, Primary Examiner

L. T. JACOBS, Assistant Examiner

U.S. Cl. X.R.

260—873